J. PIASECZNY.
PERCOLATOR.
APPLICATION FILED APR. 20, 1911.
1,008,861.
Patented Nov. 14, 1911.
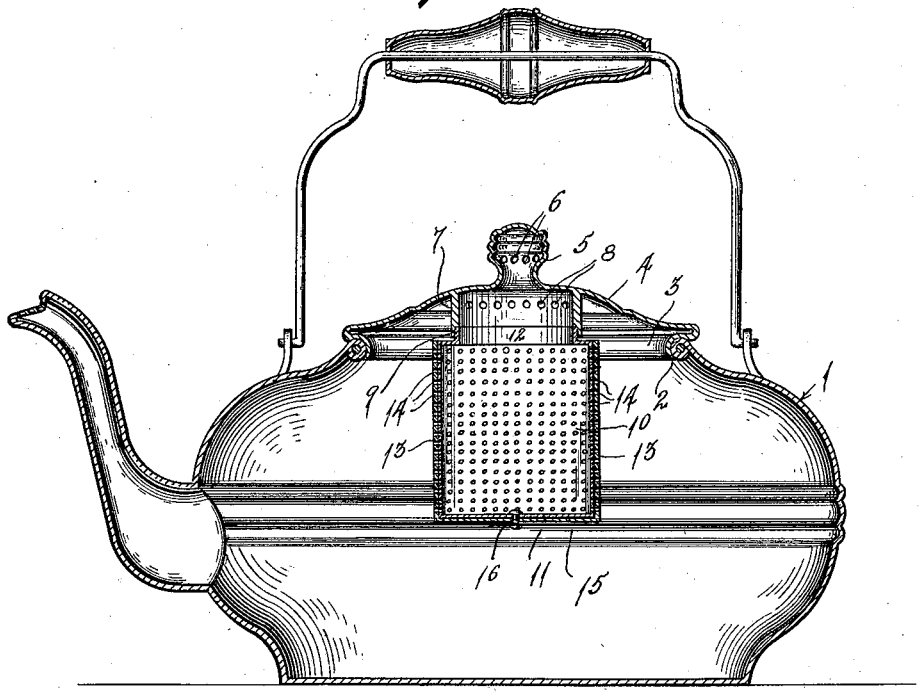
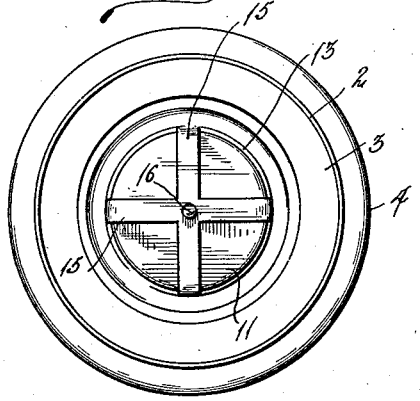
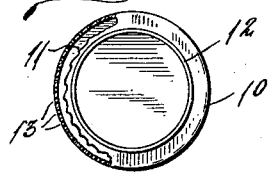
WITNESSES:
INVENTOR.
J. Piaseczny.
BY
ATTORNEYS.

UNITED STATES PATENT OFFICE.

JOHN PIASECZNY, OF HOLYOKE, MASSACHUSETTS.

PERCOLATOR.

1,008,861.  Specification of Letters Patent.  Patented Nov. 14, 1911.

Application filed April 20, 1911. Serial No. 622,223.

*To all whom it may concern:*

Be it known that I, JOHN PIASECZNY, a subject of the Czar of Russia, residing at Holyoke, in the county of Hampden and State of Massachusetts, have invented certain new and useful Improvements in Percolators, of which the following is a specification, reference being had therein to the accompanying drawing.

This invention relates to percolators for coffee and tea pots, and the primary object of my invention is to provide a percolator that can be detachably connected to the lid of a coffee pot, whereby it can be easily cleaned and maintained in a sanitary condition.

A further object of the invention is to provide a coffee percolator that is simple in construction, durable and highly efficient for the purposes for which it is intended.

I attain the above objects by a mechanical construction that will be hereinafter specifically described and then claimed.

Reference will now be had to the drawing, wherein:—

Figure 1 is a vertical sectional view of the percolator, Fig. 2 is a bottom plan of the same, and Fig. 3 is a top plan partly broken away and partly in sections with the shutter thereof removed.

The reference numeral 1 denotes a conventional form of coffee or tea pot having an opening 2 for the rim 3 of a lid 4. The lid 4 has a hollow handle 5 which is perforated, as at 6, said handle being in communication with the interior of a depending sleeve 7, carried centrally of the lid 4. The sleeve 7 has the walls thereof provided with circumferentially arranged perforations or openings 8, and the lower end of the sleeve has the inner wall thereof screw threaded, as at 9.

10 denotes a cylindrical foraminous holder having a flat solid bottom 11 and the upper end thereof reduced to form a nipple 12, said nipple being exteriorly screw threaded to screw into the lower end of the sleeve 7. The openings or perforations of the holder 10 are equally spaced and circumferentially arranged, and revolubly mounted upon the holder 10 is a shutter 13 provided with openings or perforations 14 adapted to register with the openings or perforations of the holder 10. The lower end of the shutter 13 has a spider 15 which is pivotally connected to the bottom of the holder 10 by a rivet or pin 16. When the holder 10 is detached ground coffee can be placed in the holder and then the holder attached to the sleeve 7. Water can then be placed in the pot 1, the lid 4 replaced, and as the water within the pot is boiled, the strength and essence of the ground coffee is exhausted by the steam and boiling water.

With the perforations of the shutter registering with the perforations of the holder, coffee can be quickly prepared, but should it be desired to slowly prepare the coffee or delay its preparation, the shutter can be rotated whereby the openings of the holder will be partially or completely closed.

The percolator in its entirety is made of light and durable non-corrodible metal and can be made of various sizes.

What I claim is:—

1. A percolator comprising a sleeve adapted to be secured to and depending from the lid of a coffee pot, a foraminous holder provided with a bottom and having its top connected to said sleeve, and a perforated shutter for opening and closing the opening of the holder, said shutter pivotally connected to said holder.

2. A percolator comprising a sleeve adapted to be connected to and depending from the lid of a coffee pot, a holder including a foraminous body portion formed with a closed bottom and an open top, said holder having its top detachably connected to said sleeve, and a perforated shutter surrounding said body-portion for opening and closing the openings thereof, said shutter pivotally connected to the bottom of said holder.

In testimony whereof I affix my signature in the presence of two witnesses.

JOHN PIASECZNY.

Witnesses:
RICHARD P. STAPLETON,
STANLY RIELAT.

Copies of this patent may be obtained for five cents each, by addressing the "Commissioner of Patents, Washington, D. C."